(12) United States Patent  
Goei

(10) Patent No.: US 9,228,310 B2
(45) Date of Patent: Jan. 5, 2016

(54) TIRE ASSEMBLY AND A METHOD OF BUILDING A SUPPORT STRUCTURE IN A MARINE ENVIRONMENT USING TIRES

(71) Applicant: Douglas Goei, Vancouver (CA)

(72) Inventor: Douglas Goei, Vancouver (CA)

(*) Notice: Subject to any disclaimer, the term of this patent is extended or adjusted under 35 U.S.C. 154(b) by 0 days.

(21) Appl. No.: 14/323,825

(22) Filed: Jul. 3, 2014

(65) Prior Publication Data

US 2014/0321913 A1    Oct. 30, 2014

Related U.S. Application Data

(63) Continuation of application No. PCT/CA2013/050018, filed on Jan. 11, 2013.

(51) Int. Cl.
*E02B 3/18* (2006.01)
*B29B 17/00* (2006.01)
*E02D 27/04* (2006.01)
*B63B 22/04* (2006.01)

(52) U.S. Cl.
CPC . *E02B 3/18* (2013.01); *B29B 17/00* (2013.01); *B63B 22/04* (2013.01); *E02D 27/04* (2013.01); *Y02W 30/62* (2015.05)

(58) Field of Classification Search
CPC ........ B29B 17/00; B63B 21/48; B63B 22/04; E02D 27/04; E02D 27/32; E02B 2201/04; E02B 3/18; Y02W 30/62
USPC ........... 405/15, 16, 17, 18, 19, 21, 23, 24, 25, 405/26, 27, 28, 211, 212, 215; 119/222; 114/241, 240 A, 240 B, 240 D, 240 E
See application file for complete search history.

(56) References Cited

U.S. PATENT DOCUMENTS

| | | | | |
|---|---|---|---|---|
| 4,378,749 A * | 4/1983 | Leblanc et al. | ............... | 114/220 |
| 4,997,309 A * | 3/1991 | Kiselewski | ..................... | 405/16 |
| 5,178,489 A * | 1/1993 | Suhayda | ........................ | 405/21 |
| 5,213,058 A * | 5/1993 | Parker et al. | .................. | 119/208 |
| 5,238,325 A | 8/1993 | Krenzler | | |
| 5,762,448 A * | 6/1998 | Bilanin | .......................... | 405/73 |
| 6,712,024 B1 | 3/2004 | Hall | | |
| 2004/0240945 A1 * | 12/2004 | Frantz | ........................... | 405/216 |
| 2009/0080981 A1 | 3/2009 | Cederlund | | |
| 2011/0100804 A1 * | 5/2011 | Krone et al. | .................. | 204/242 |

FOREIGN PATENT DOCUMENTS

| | | |
|---|---|---|
| CA | 2074981 A1 | 1/1994 |
| CA | 2206334 A1 | 11/1997 |
| TW | 201028510 A | 8/2010 |
| WO | WO92/01118 | 1/1992 |

* cited by examiner

*Primary Examiner* — John Kreck
*Assistant Examiner* — Carib Oquendo
(74) *Attorney, Agent, or Firm* — Davis, Malm & D'Agostine P.C.

(57) ABSTRACT

A tire assembly for use in reclaiming land from a marine environment. An anchor having at least one cable connected thereto acts as a base to which tires are connected by threading them down the cable to form a cylindrical tower of tires which can be filled with concrete or filler if desired. A plurality of the tire assemblies can be positioned adjacent to one another and further interconnected for stability purposes and can form the basis for further structural elements.

14 Claims, 5 Drawing Sheets

TIRE ASSEMBLY AND A METHOD OF BUILDING A SUPPORT STRUCTURE IN A MARINE ENVIRONMENT USING TIRES

FIELD OF THE INVENTION

The present invention relates to a method for reclaiming land from a body of water. More particularly it relates to the use of used tires to build a support structure for reclaiming land from a body of water and a tire assembly for use with same.

BACKGROUND OF THE INVENTION

As the world population continues to explode the need for land for housing and other purposes continues to increase. Coastal land is in particularly high demand given the desirability of being adjacent to a body of water. Many techniques have been developed to reclaim land from a body of water in order to develop new coastal land for building purposes.

Environmental concerns are becoming more prevalent as the human race continues to exploit natural resources at an ever increasing rate. One such environmental concern relates to how to dispose of used tires. It is known to make use of used vehicle tires for erosion prevention and for reclaiming land in a marine environment, however to date no simple, functional design has been developed.

Accordingly, it is an object of an embodiment of the present invention to provide a method for reclaiming land from a marine environment using tires.

Other objects of the invention will be apparent from the description that follows.

SUMMARY OF THE INVENTION

The invention consists of a method of reclaiming land from a marine environment using used tires and an assembly for use in same, the assembly comprising an anchor for embedding in the soil at the bottom of a body of water to which is connected at least one cable upon which are threaded a plurality of used tires to form a cylindrical column extending from the anchor to the surface of the body of water. The assembly may be filled with concrete, sand or other filler to provide added mass and structural support.

In the method, the anchor is first positioned at a location on the bottom, the weight and shape of the anchor driving it into the bottom surface. At least one cable is connected to the anchor and a plurality of used tires are threaded onto the anchor one by one until a vertical column extending from the anchor on the bottom to the top of the body of water has been built. A plurality of these assemblies are set side by side each other so as to build an outer framework defining a structure and may form a formwork within which concrete or other filler may be poured to build a foundation upon which further structures may be built. Adjacent assemblies may be linked and connected to one another by a series of cables or other connections thereby providing resistance to lateral forces within the body of water.

The foregoing was intended as a broad summary only and of only some of the aspects of the invention. It was not intended to define the limits or requirements of the invention. Other aspects of the invention will be appreciated by reference to the detailed description of the preferred embodiment and to the claims.

BRIEF DESCRIPTION OF THE DRAWINGS

These and other features of the invention will become more apparent from the following description in which reference is made to the appended drawings and wherein.

DESCRIPTION OF THE PREFERRED EMBODIMENTS

Figures 1, 1A:
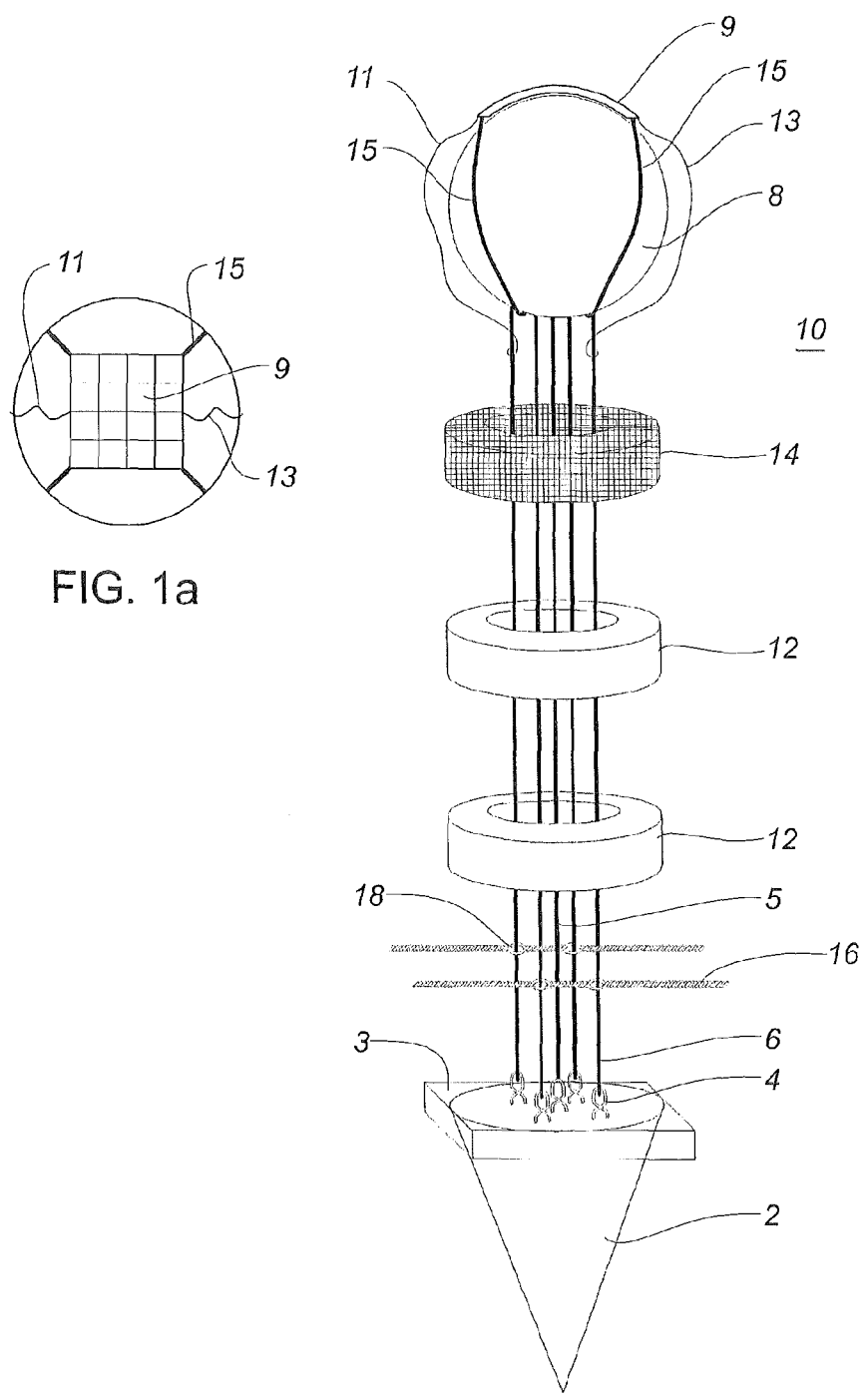
FIG. 1 is a perspective view of a tire assembly according to the present invention.
FIG. 1a is a top view of the floating ball shown in FIG. 1 showing the solar panel connected to it.

A tire assembly 10 according to the invention is shown in FIG. 1. The tire assembly 10 comprises an anchor 2 upon which a plurality of used tires 12 are stacked to form a column extending up to the surface of the body of water as discussed in more detail below.

Anchor 2 is preferably in the form of a cone or polyhedron such as a pyramid such that it has a pointed end for penetrating into the bottom surface of the body of water in which it is placed. For the purposes of this application, the bottom of the body of water will be referred to as the seabed, although it could also include the bottom of a lake, river or other body of water. The anchor 2 is preferably made of concrete or other suitable material and is of sufficient size and weight to correspond to the diameter of the tires to be placed upon it and to act as a suitable anchored base support. Anchor 2 could also have an extended platform portion 3.

The top of the anchor has at least one connector 4. A cable is attached to the connector 4. In the preferred embodiment shown there are a series of five connectors 4, one located centrally and the remaining four positioned to form a square corresponding to the inner diameter of the used tires to be stacked on the anchor 2. A central cable 5, connected to the centrally located connector, can be used to support the anchor as it is lowered to the seabed. If necessary, a diver or submarine vessel could be used to assist with the positioning of the anchor as it is lowered into the seabed. Once the anchor is in position, central cable 5 may be connected to a float 8 to hold the cable in place at the surface. The float 8 also acts as an indicator for surface vessels as to the location of the tire assembly.

A further set of four cables 6 are connected to the remaining connectors 4 to form a guiding element for guiding the used tires 12 unto the anchor 2. Additional laterally extending cables 16 can be connected to the cables 6; for example, by threading cables 6 through openings 18. The laterally extending cables 16 are also connected to adjacent tire assemblies so as to link adjacent structures and provide added lateral support.

Figure 2:
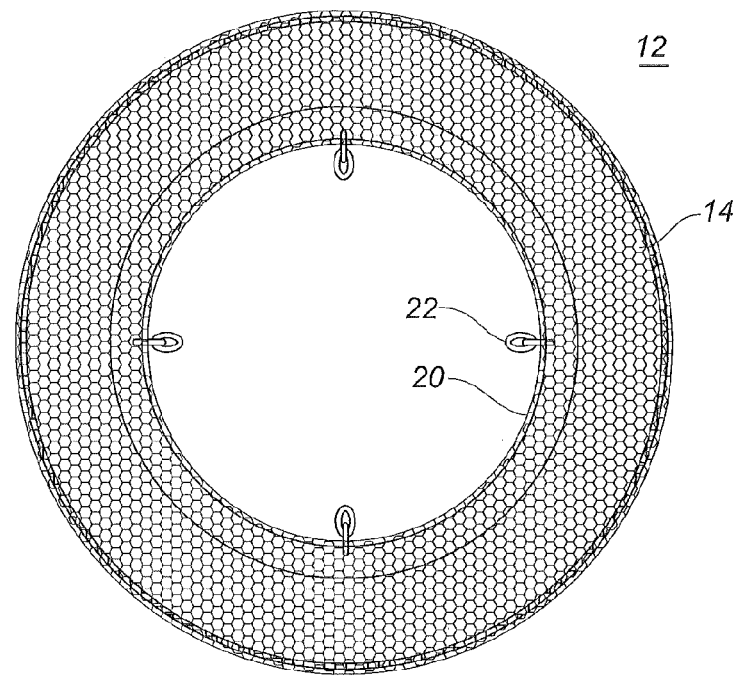
FIG. 2 is a top view of a tire for use in the assembly shown in FIG. 1.
Figure 2A:
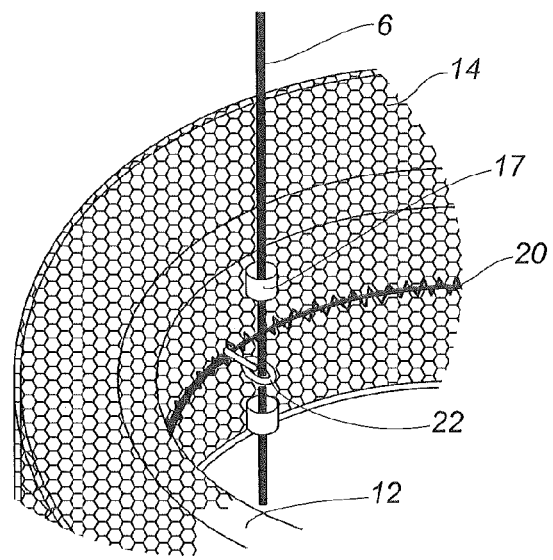
FIG. 2a is a perspective view of a portion of the tire shown in FIG. 2 showing a cable connected thereto.

As shown in FIGS. 2 and 2a, a tire 12 is preferably wrapped in a wire mesh 14 to which a wire 20 is threaded so as to close off the wire mesh along the interior diameter of the tire. A series of 4 clips 22 are connected to wire 20 through which cables 6 will be threaded so as to guide the tires from the surface down to the anchor at the bottom. Further guiding elements 17 may also be used to assist with the aligning of the cables 6. It is also contemplated that other guiding connectors could be used and that they could be connected to the tire in a different fashion. The wire mesh provides an added structure to promote marine growth once the tire 12 is placed in a marine environment and the tire and mesh could be treated with a material designed to promote the growth of marine life. The mesh provides a protective structure for small fish to swim in and out of the interior of the tire. Alternatively, if it is desired to fill the tires with material prior to threading them onto the assembly, the wire mesh helps hold the material in place. It is contemplated that the tire could be filled with concrete, stone, expanded clay, pebbles, sand, or other suitable material.

The tires 12 are threaded onto cables 6 (the cables being inserted through the respective openings on clips 22) and they each in turn sink down to the level of the anchor forming a vertical column of tires extending to the level of the surface. A suitable barge having a crane and related necessary equipment may be used. Once a sufficient number of tires have been added so as to reach a desired height the cables 6 may also be connected to float 8 so as to hold them in place, as shown in FIG. 1.

A solar panel 9 may be placed atop the float 8 and connected thereto, preferably by straps 15 as shown in FIGS. 1 and 1a. A pair of connecting wires, one positive wire 11 and one negative wire 13, extend from the solar panel 9 and are connected to separate ones of said four cables 6. The solar panel provides a small current that travels through the cable 6, clips 22, and wire 20 to the wire mesh 14 wrapped about the tires. The small current may assist in further promoting marine growth on the wire mesh. It is also contemplated that the solar panel could be equipped with a rechargeable battery and a light adapted to turn on when it is dark so that the floats are more visible.

Figure 3A:
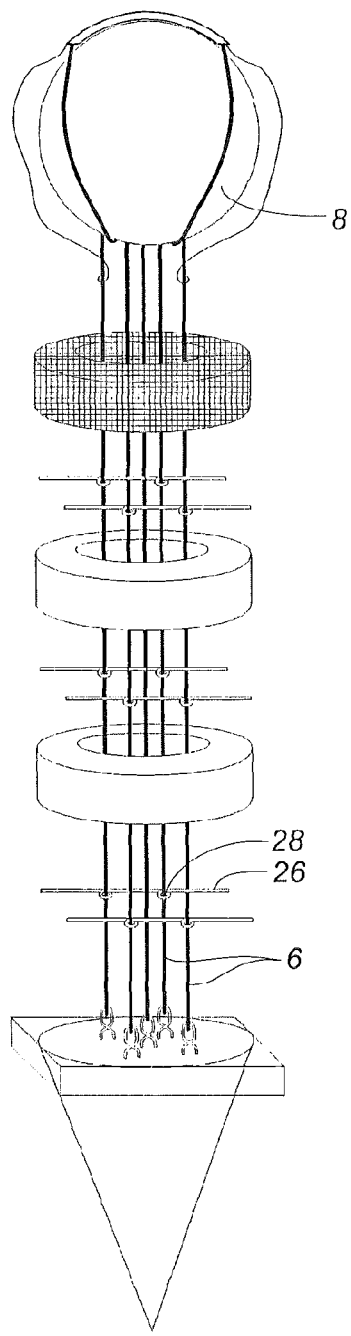
FIG. 3a is a perspective view of a tire assembly showing a cable connection technique according to the invention.
Figure 3B:
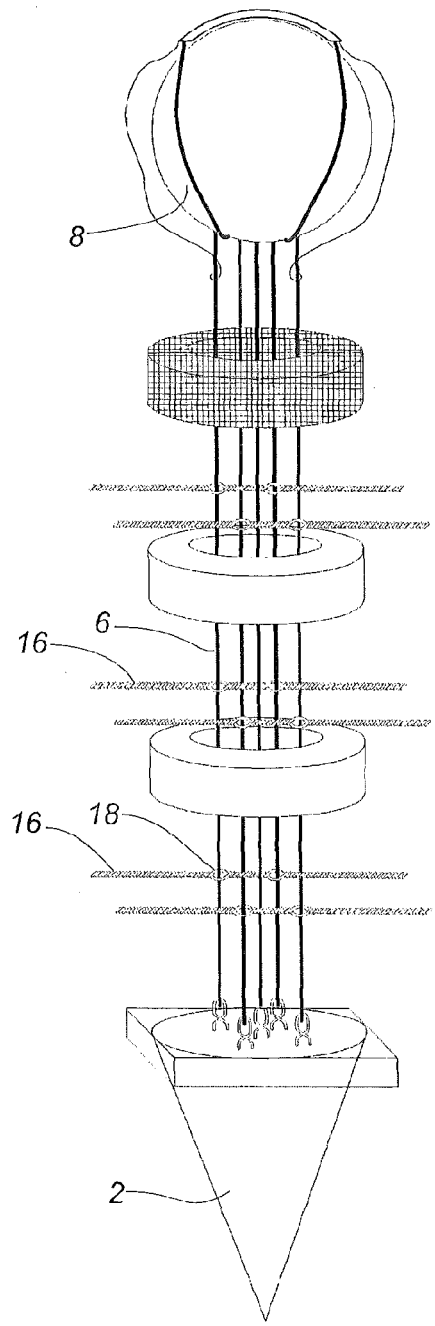
FIG. 3b is a perspective view showing an alternative cable connection technique according to the invention.

As shown in FIG. 3a, an alternative embodiment is contemplated whereby lateral cables 26 could be wrapped around the cables 6, as indicated by reference numeral 28, so as to connect adjacent tire assemblies 10. The lateral cables 26 can be alternated with the placement of the tires so as to create a strong interconnected network. As shown in both FIGS. 3a and 3b, the lateral cables 26 and 16, respectively, are shown alternating with the tires—ie. a layer of lateral cables is followed by a tire, which is followed by a further set of lateral cables, etc. The actual format can be varied depending on the size of the assembly and the conditions expected in the area of installation—for example, perhaps there is one set of lateral cables extending between adjacent tire assemblies for every 3 tires threaded on, or any other suitable number. It is also contemplated that other connection techniques between the lateral cables and the anchor cables 6 could be used.

It is contemplated that once a cylindrical column of tires has been completed that it could be in-filled with a suitable filler such as concrete, sand or the like depending on the intended use. If a stronger pillar like unit is required then the inner column defined by the interior of the tires 12 would be filled with concrete. If in-filled, the connections to the float would be disconnected and any anchor cables (5, 6) could be connected to the top tire of the assembly.

Figure 4:
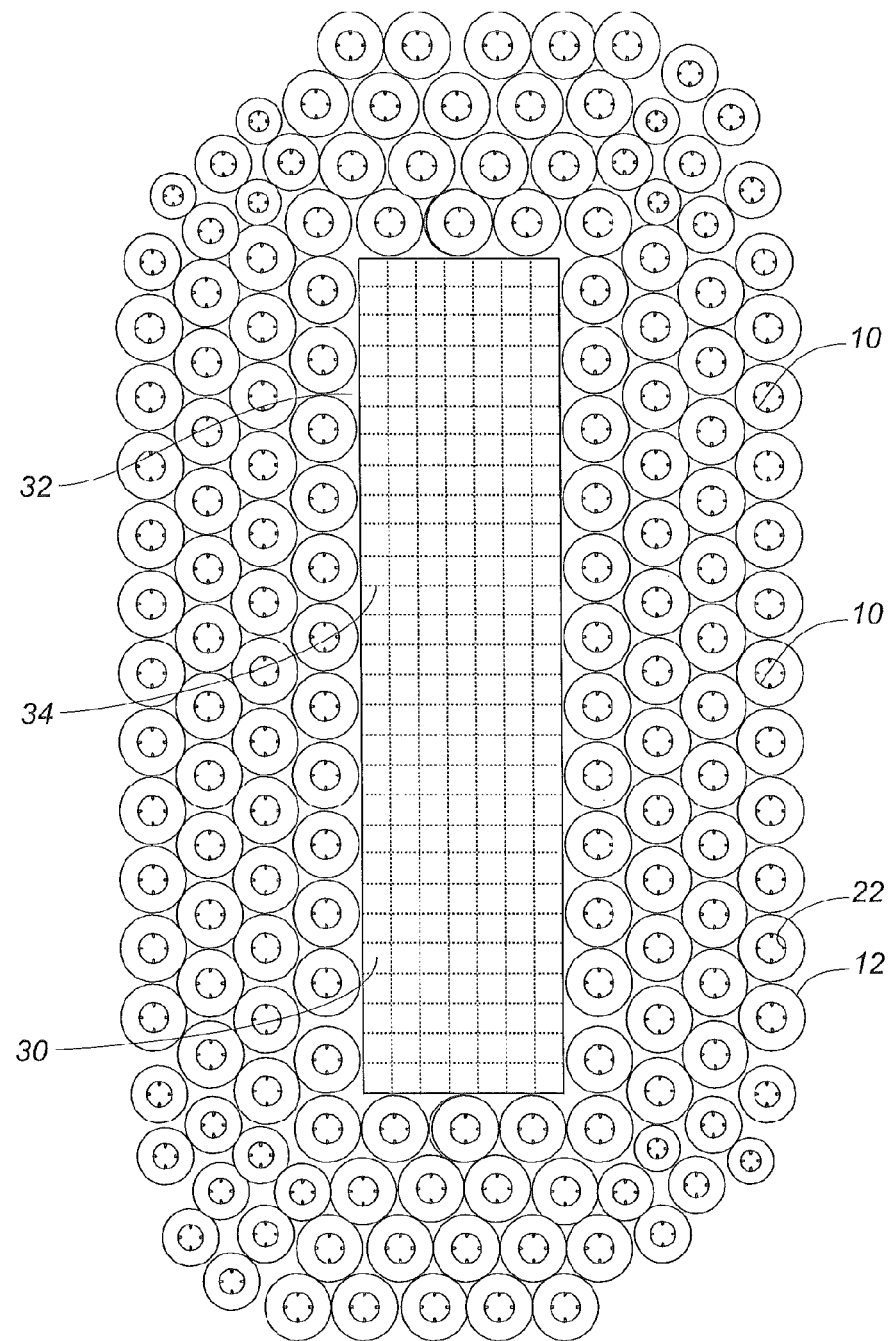
FIG. 4 is a top plan view showing a reclaimed land mass developed using a plurality of the tire assemblies shown in FIG. 1.

FIG. 4 shows a plurality of tire assemblies 10 positioned adjacent to one another to form a large structure upon which further development may be accomplished. For simplicity and ease of viewing, the tire assemblies have been shown showing the top tire without mesh and with no float. As shown, the assemblies have formed an outer formwork, the inner portion 30 of which can be backfilled with suitable material depending on the intended use. For example, it could be filled with rock, gravel, sand, clay or other soil to provide an area for the growth of plants at the surface level. If a stronger support structure is required, it could be lined with framing material 32 (such as plastic sheeting or wood or steel panels or other suitable framing material) along the outside edges and filled with concrete or other filler. Rebar 34 could also be set in place to provide further rigidity.

Figure 5:
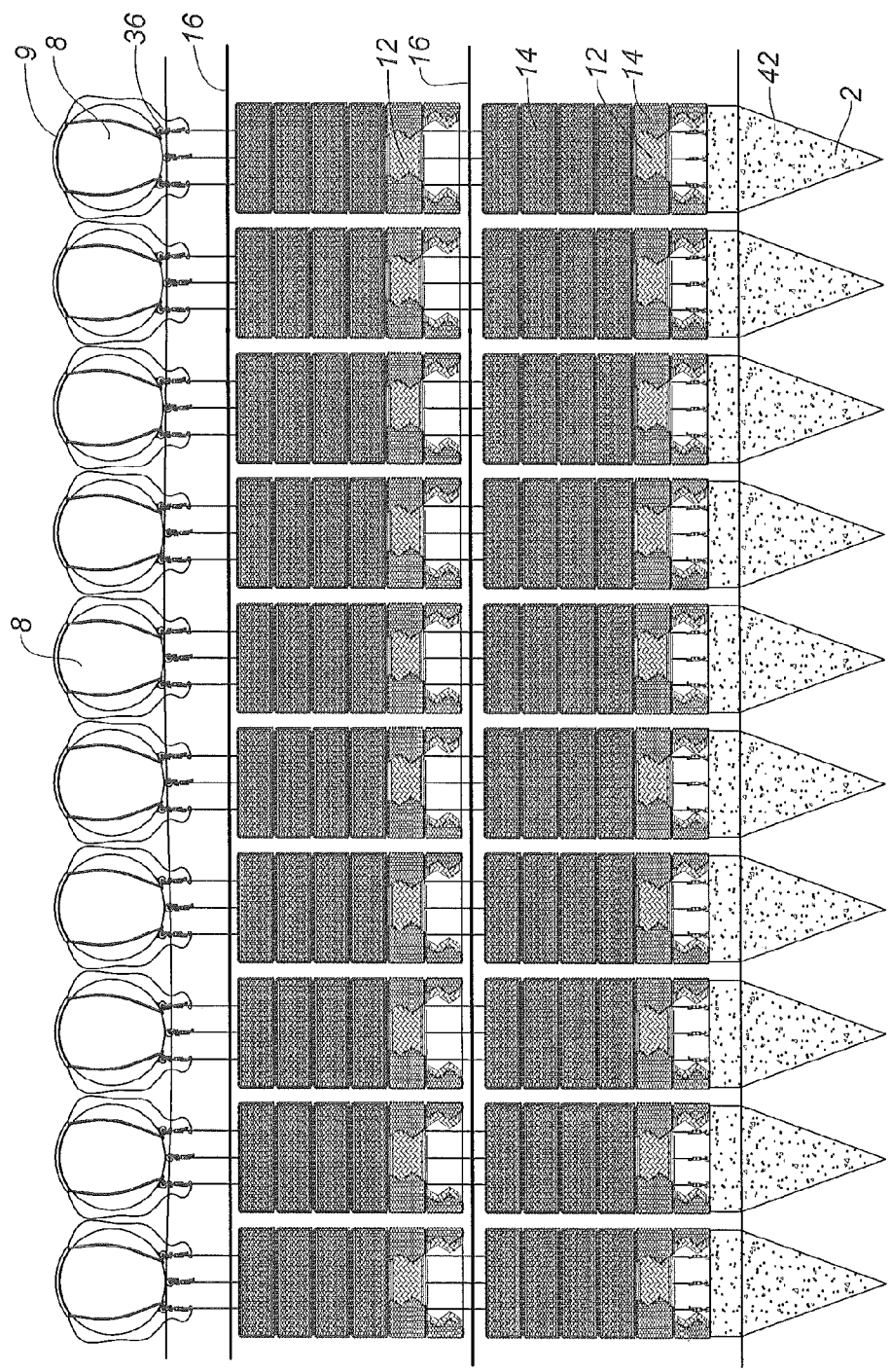
FIG. 5 is a side view showing a plurality of tire assemblies according to the invention, with portions of some of the tires cut away to reveal underlying components.

FIG. 5 shows a plurality of adjacent tire assemblies 10 forming a wall. Anchor 2 is formed of concrete 42 having rebar therein, the rebar terminating in connectors for connecting to cables 5, 6. A plurality of wire mesh 14 encased tires 12 have been threaded down cables 6 and sit atop the anchors 2. Various tires are shown in partial section, first to reveal the tire 12 behind the wire mesh 14 and to reveal the anchor cables 5, 6 positioned within the inner diameter of the tires 12. The anchor cables are connected to floats 8 using quick clips 36. A gap between the stacked tires has been shown simply to reveal the presence of lateral connecting cable 16. In actual practice, there would be no such gap visible as the tires would simply be stacked one on top of the other.

Both the resulting structure and the tire assembly columns could then be used as a support for the building of further structures such as buildings, roads, parks, etc.

It will be appreciated by those skilled in the art that the preferred and alternative embodiments have been described in some detail but that certain modifications may be practiced without departing from the principles of the invention.

What is claimed is:

1. A method for reclaiming land from a marine environment comprising:
    connecting a first end of a cable to a to surface of an anchor, said to surface forming a platform;
    lowering said anchor by said cable to a bottom of a body of water;
    threading a plurality of tires down the cable to the anchor to form a cylindrical stack of tires seated on said to surface of said anchor, said to surface corresponding in size to the diameter of said tires.

2. The method of claim 1 wherein a float is connected to a second, opposite end of said cable after said anchor is lowered to said bottom.

3. The method of claim 2 wherein each tire of said plurality of tires is wrapped in a wire mesh.

4. The method of claim 1 further comprising repeating the steps to produce a plurality of adjacent stacks of tires to form an outer formwork defining a space.

5. The method of claim 4 wherein said plurality of adjacent stacks of tires are interconnected by at least one lateral connecting cable.

6. The method of claim 4 comprising infilling the space defined by the outer formwork.

7. A method for reclaiming land from a marine environment comprising:
    lowering an anchor having at least one cable having a first end connected thereto to a bottom of a body of water;
    threading a plurality of tires down the cable to the anchor to form a cylindrical stack of tires seated on said anchor, each of said plurality of tires wrapped in a wire mesh:
    connecting a float to a second, opposite end of said at least one cable; and
    wherein a solar panel is positioned atop said float and provides a current to said wire mesh.

8. A method for reclaiming land from a marine environment comprising:
    lowering an anchor having an anchor cable having a first end connected thereto to a bottom of a body of water;

threading a plurality of tires down the cable to the anchor to form a cylindrical stack of tires on said anchor, said stack of tires defining an inner column; and infilling said inner column defined by said cylindrical stack of tires with concrete.

9. A tire assembly for use in reclaiming land from a marine environment comprising:

an anchor having at least one connector on a top surface thereof;

an anchor cable connected at one end to said connector;

four guiding cables connected to said anchor;

at least one tire threaded onto said anchor cable and seated on said anchor; and wherein said at least one tire has a wire mesh wrapped about it, said wire mesh sealed with a connecting wire to which four clips are connected, and wherein each of said four guiding cables is threaded through a respective one of said four clips.

10. The tire assembly of claim 9, further comprising a float connected to said at least one anchor cable at a second end of said cable.

11. The tire assembly of claim 10, further comprising a solar panel seated atop said float, said solar panel connected, and providing a current, to said wire mesh.

12. The tire assembly of claim 9 wherein said anchor has a pointed end for penetrating a bottom of said marine environment and an opposed flat end forming a platform upon which said at least one tire sits.

13. The tire assembly of claim 9 wherein said at least one tire comprises a plurality of tires threaded onto said anchor cable, said plurality of tires forming a cylindrical stack.

14. The tire assembly of claim 13 wherein said cylindrical stack is infilled with concrete, forming a concrete column.

* * * * *

UNITED STATES PATENT AND TRADEMARK OFFICE
CERTIFICATE OF CORRECTION

PATENT NO.        : 9,228,310 B2
APPLICATION NO.   : 14/323825
DATED             : January 5, 2016
INVENTOR(S)       : Douglas Goei It is certified that error appears in the above-identified patent and that said Letters Patent is hereby corrected as shown below:

Claims
Column 4, Lines 32, 33, 37 and 38, before the word 'surface', each occurrence, the word -to- should read --top--.

Signed and Sealed this
Nineteenth Day of April, 2016

Michelle K. Lee
*Director of the United States Patent and Trademark Office*